(12) United States Patent
Bayoux et al.

(10) Patent No.: US 11,524,567 B2
(45) Date of Patent: Dec. 13, 2022

(54) HYBRID TRANSMISSION UNIT HAVING TWO PLANETARY WHEEL SETS AND A PLURALITY OF SWITCHING DEVICES; AND MOTOR VEHICLE

(71) Applicant: Schaeffler Technologies AG & Co. KG

(72) Inventors: Laurent Bayoux, Strasbourg (FR); Matthieu Rihn, Kuttolsheim (FR)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/297,877

(22) PCT Filed: Oct. 29, 2019

(86) PCT No.: PCT/DE2019/100930
§ 371 (c)(1),
(2) Date: May 27, 2021

(87) PCT Pub. No.: WO2020/108687
PCT Pub. Date: Jun. 4, 2020

(65) Prior Publication Data
US 2022/0032766 A1   Feb. 3, 2022

(30) Foreign Application Priority Data

Nov. 30, 2018   (DE) .......................... 102018130498.6

(51) Int. Cl.
*B60K 6/547*   (2007.10)
*B60K 6/365*   (2007.10)
(Continued)

(52) U.S. Cl.
CPC .............. *B60K 6/547* (2013.01); *B60K 6/365* (2013.01); *B60K 6/44* (2013.01); *B60K 6/543* (2013.01);
(Continued)

(58) Field of Classification Search
None
See application file for complete search history.

(56) References Cited

U.S. PATENT DOCUMENTS

| 7,559,864 B2 * | 7/2009 | Maeda | B60K 6/445 |
| | | | 180/65.31 |
| 8,579,750 B2 * | 11/2013 | Park | B60K 6/445 |
| | | | 475/5 |

(Continued)

FOREIGN PATENT DOCUMENTS

| DE | 102015209294 A1 | 11/2016 |
| DE | 102015216896 A1 | 3/2017 |

(Continued)

OTHER PUBLICATIONS

Search Report of PCT/DE2019/100930.

*Primary Examiner* — Dirk Wright
(74) *Attorney, Agent, or Firm* — Davidson, Davidson & Kappel, LLC

(57) ABSTRACT

A transmission unit for a hybrid motor vehicle, has a planetary gearing. The planetary gearing is fitted with a first planetary wheel set and a second planetary wheel set. The transmission unit also includes an electric machine, which is coupled with a component part of the planetary gearing, and a plurality of switching devices, each of which forming a brake or a clutch, and each being movable between an activated position and a deactivated position. The switching devices are operatively installed for switching various transmission ratios between an input, which can be coupled with an internal combustion engine, and an output, and/or between the electric machine and the output. No more than four switching devices are present for implementing at least two different transmission ratios in a drive state of the internal combustion engine, at least one transmission ratio in a drive state of the electric machine, and at least one (Continued)

transmission ratio in a recuperation state of the electric machine, as a result of their activated and deactivated positions.

20 Claims, 9 Drawing Sheets

(51) Int. Cl.
    *B60K 6/44*         (2007.10)
    *B60K 6/543*      (2007.10)
    *F16H 3/72*       (2006.01)

(52) U.S. Cl.
    CPC ............ *F16H 3/72* (2013.01); *B60Y 2200/92* (2013.01); *B60Y 2400/72* (2013.01); *B60Y 2400/73* (2013.01); *F16H 2200/0056* (2013.01); *F16H 2200/2007* (2013.01); *F16H 2200/2041* (2013.01)

(56) References Cited

U.S. PATENT DOCUMENTS

| | | | |
|---|---|---|---|
| 9,371,892 B2 * | 6/2016 | Lee | B60K 6/445 |
| 10,017,040 B2 * | 7/2018 | Hata | B60K 6/445 |
| 2003/0199352 A1 | 10/2003 | Tsai et al. | |
| 2009/0176610 A1 * | 7/2009 | Conlon | B60K 6/547 |
| | | | 475/5 |
| 2009/0186735 A1 | 7/2009 | Iwanaka et al. | |
| 2012/0122622 A1 | 5/2012 | Turnbull et al. | |
| 2020/0331336 A1 | 10/2020 | Kaltenbach et al. | |

FOREIGN PATENT DOCUMENTS

| | | | | |
|---|---|---|---|---|
| DE | 102016216691 A1 * | 3/2018 | | |
| DE | 102016224458 A1 | 6/2018 | | |
| DE | 102017218513 A1 * | 4/2019 | | B60K 6/36 |
| DE | 102017218513 A1 | 4/2019 | | |
| EP | 2146855 B1 | 1/2012 | | |
| JP | 6331058 B2 | 5/2018 | | |

* cited by examiner

| Main operating modes | | K1 | K2 | B1 | B2 |
|---|---|---|---|---|---|
| Parallel operation | 1st gear ICE | X | | | X |
| | 2nd gear ICE | | X | | X |
| | 3rd gear ICE | X | X | | |
| | 4th gear ICE | | X | X | |
| | Stationary charging | | X | | |
| Pure e-operation | 1st gear EM | | | | X |
| | 2nd gear EM | | | X | |
| Reverse driving | electric | | | | X |
| | eCVT | X | | | |

| Main operating modes | | K1 | K2 | K3 | B1 | B2 |
|---|---|---|---|---|---|---|
| Parallel operation | 1st gear ICE | X | | X | | X |
| | 2nd gear ICE | | X | X | | X |
| | 3rd gear ICE | X | X | X | | |
| | 4th gear ICE | | X | X | X | |
| Serial operation | | | X | | | |
| stationary charging | | X | X | | | |
| Pure e-operation | 1st gear EM | | | X | | X |
| | 2nd gear EM | | | X | X | |
| Reverse driving | electric | | | X | | X |
| | eCVT | X | | X | | |

| Main operating modes | | K1 | K2 |
|---|---|---|---|
| Parallel operation | 1st gear ICE | X | |
| | 2nd gear ICE | | X |
| Stationary charging | | | X |
| Pure e-operation | 1st gear EM | | |
| Reverse driving | electric | | |
| | ecvt | X | |

Fig. 19

HYBRID TRANSMISSION UNIT HAVING TWO PLANETARY WHEEL SETS AND A PLURALITY OF SWITCHING DEVICES; AND MOTOR VEHICLE

CROSS-REFERENCE TO RELATED APPLICATIONS

This application is the U.S. National Phase of PCT Appln. No. PCT/DE2019/100930 filed Oct. 29, 2019, which claims priority to DE 10 2018 130 498.6 filed Nov. 30, 2018, the entire disclosures of which are incorporated by reference herein.

TECHNICAL FIELD

The present disclosure relates to a transmission unit (also known as a (dedicated) hybrid transmission) for a hybrid motor vehicle, comprising a planetary gearing, wherein the planetary gearing has a first planetary wheel set and a second planetary wheel set, an electric machine, which is coupled with a component part of the planetary gearing, and a plurality of switching devices, each of which forming a brake or a clutch, and each can be moved between an activated position and a deactivated position, wherein the switching devices are operatively installed for switching different transmission ratios between an input that can be coupled to an internal combustion engine and an output and/or between the electric machine and the output. The present disclosure also relates to a motor vehicle having this transmission unit and an internal combustion engine.

BACKGROUND

Various generic designs of hybrid transmissions have already been implemented from the prior art. For example, US 2012/0122622 A1 discloses a hybrid transmission having an input element, an output element and a single motor/generator.

Furthermore, EP 2 146 855 B1 also discloses a hybrid drive system for a vehicle. DE 10 2016 224 458 A1 implements a motor vehicle transmission with planetary wheel sets with the same stationary static ratio. Further prior art is known from JP 6331058 B2.

SUMMARY

As a disadvantage of the designs known from the prior art, however, it has been found that the transmission units often have a relatively complex structure, which is due to the relatively large number of switching devices that are present. This brings with it an increased production and assembly effort as well as an increased space requirement. Certain arrangements of the transmission unit relative to an internal combustion engine of the respective motor vehicle can therefore not be implemented or can only be implemented with relative difficulty.

Therefore, an object of the present disclosure is for example to eliminate the disadvantages known from the prior art and, in particular, to provide a hybrid transmission unit which has the simplest structure possible and is implemented in a compact manner.

A transmission unit is provided that includes no more than four switching devices for implementing at least two different transmission ratios in a drive state of the internal combustion engine, at least one transmission ratio in a drive state of the electric machine and at least one transmission ratio in a recuperation state of the electric machine through their activated and deactivated positions.

As a result, the number of switching devices that are present is significantly reduced, wherein however different transmission ratios in one drive state of the internal combustion engine and the electric machine enable sufficient power conversion.

Further advantageous embodiments are explained in more detail below.

Accordingly, it is advantageous if a first switching device and/or a second switching device (of no more than four switching devices) are/is designed as a clutch. As a result, an internal combustion engine in particular can be cleverly coupled to the planetary gearing.

It has been found to be useful if the first switching device is designed as a clutch that is operatively installed between the input and a first sun gear which meshes with the first planetary wheel set, so that, in the activated position of the first switching device, the input is rotationally connected with the first sun gear (i.e., a drive power can be transmitted between the input and the first sun gear) and, in the deactivated position of the first switching device, the input is decoupled from the first sun gear (i.e., no drive power can be transmitted between the input and the first sun gear).

On the part of the second switching device, it is particularly expedient if it is designed as a clutch that is operatively installed between the input and a first planetary carrier of the first planetary wheel set so that, in the activated position of the second switching device, the input is rotationally connected to the first planetary carrier (i.e., a drive power can be transmitted between the input and the first planetary carrier) and, in the deactivated position of the second switching device, the input is decoupled from the first planetary carrier (i.e., no drive power can be transmitted between the input and the first planetary carrier).

Furthermore, it is expedient if a third switching device and/or a fourth switching device (of the no more than four switching devices) are/is designed as a brake. This means that the other transmission ratios can also be switched easily.

In this context, it is also advantageous if the third switching device is designed as a brake acting on a second sun gear, wherein the second sun gear meshes with a second planetary wheel set of the planetary gearing, so that, in the activated position of the third switching device, the second sun gear is blocked from rotation and, in the deactivated position of the third switching device, free rotation of the second sun gear is enabled.

For the fourth switching device, it is also useful if this is designed as a brake acting on the first sun gear, so that, in the activated position of the fourth switching device, the first sun gear is blocked from rotating and, in the deactivated position of the fourth switching device, a free rotation of the first sun gear is enabled.

Furthermore, it is expedient if an additional switching device is integrated into the output of the transmission unit in order to optionally decouple the transmission unit/planetary gearing completely from the remaining drive of the motor vehicle.

The no more than four switching devices are particularly preferably designed to implement four different transmission ratios in a drive state of the internal combustion engine, two different transmission ratios in a drive state of the electric machine, and to implement a transmission ratio in the recuperation state of the electric machine through their activated and deactivated positions. In this context, it is particularly advantageous if, in addition, a stationary state of charge is formed via these no more than four switching devices in that the internal combustion engine supplies drive power to the electric machine, which then acts as a generator. Furthermore, the transmission ratios of the drive states of the internal combustion engine and the electric machine preferably all differ from one another. Furthermore, it is advantageous if the no more than four switching devices also enable reversing in an electric mode or an eCVT mode (electric continuously variable transmission).

On the part of the structure of the planetary gearing, it has also been found to be expedient if a first ring gear that meshes with the first planetary wheel set is non-rotatably coupled to a second planetary carrier of the second planetary wheel set and/or the first planetary carrier of the first planetary wheel set is non-rotatably connected to a second ring gear that meshes with the second planetary wheel set.

If a rotor-fixed driving shaft of the electric machine is rotationally coupled to the first planetary carrier of the first planetary wheel set (preferably via a gear stage), the electric machine is connected to the planetary gearing in a particularly simple and compact manner. The driving shaft is preferably arranged to be parallel to a central rotational axis of the transmission unit (rotational axis of the sun gears and planetary carriers) or more preferably to be coaxial to the rotational axis.

A motor vehicle is also provided having an internal combustion engine, such as a gasoline or diesel engine, and a transmission unit according to the present disclosure according to at least one of the embodiments described above that is connected or connectable with its input to an output shaft of the internal combustion engine.

In other words, according to the present disclosure, a dedicated hybrid transmission with a planetary wheel set as well as four internal combustion engine gears and two electromotive gears is implemented. According to the present disclosure, the dedicated hybrid transmission has two planetary wheel sets, an electric machine and no more than four switching devices (and no separate disconnect clutch) for connecting or decoupling an internal combustion engine to/from the drive train for pure electric driving.

BRIEF SUMMARY OF THE DRAWINGS

In the following, the present disclosure is now explained in more detail with reference to figures.

In the drawings:

FIG. 19 shows a diagram to illustrate all the gears that can be switched by the transmission unit of FIG. 18.

DETAILED DESCRIPTION

The figures are only schematic in nature and serve only for understanding the present disclosure. The same elements are provided with the same reference symbols. In principle, the various exemplary embodiments can also be freely combined with one another.

Figures 1, 2:
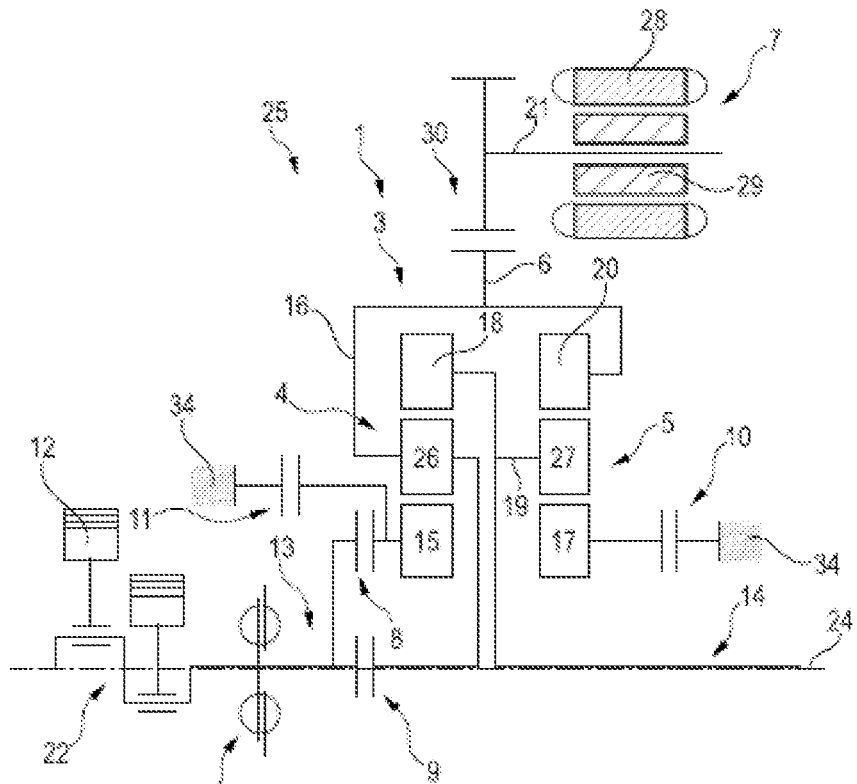
FIG. 1 shows a schematic sectional representation of a transmission unit according to the present disclosure, installed in a partially illustrated drive train of a motor vehicle, according to a first exemplary embodiment.
FIG. 2 shows a diagram to illustrate all the gears that can be switched by the transmission unit of FIG. 1, FIGS. 3a to 3d show four schematic sectional views of the transmission unit, similar to FIG. 1, wherein torque flows are visible at four different transmission ratios/gears in a drive state of an internal combustion engine.
Figure 8:
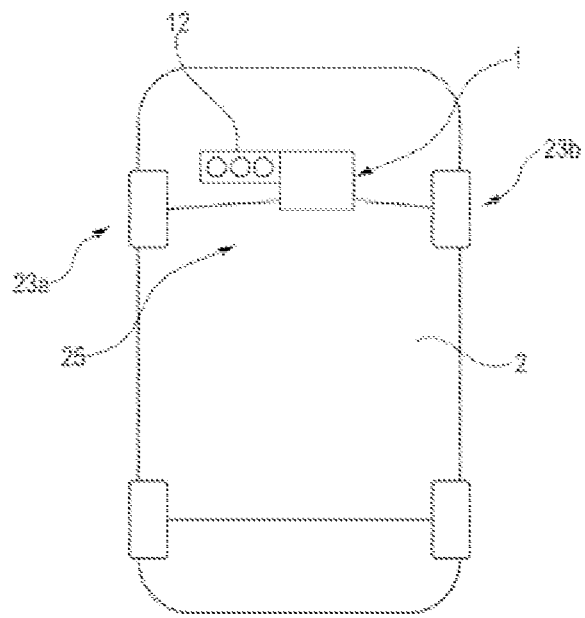
FIG. 8 shows a schematic representation of a motor vehicle including the transmission unit according to the present disclosure according to FIG. 1, wherein the transmission unit is installed on the front axle of the motor vehicle and in a transverse arrangement with the internal combustion engine.

FIG. 1 clearly shows a drive train 25 of a motor vehicle 2 on the part of a transmission unit 1 according to the present disclosure. The transmission unit 1 installed in this drive train 25 is implemented as a hybrid transmission and, alternatively, also designated as such. A preferred position of the transmission unit 1 and the drive train 25 is shown in FIG. 8 in a schematically represented motor vehicle 2 (here a car). It can be seen here that the transmission unit 1 with the drive train 25 is operatively installed on a front axle of the motor vehicle 2.

Figure 9:
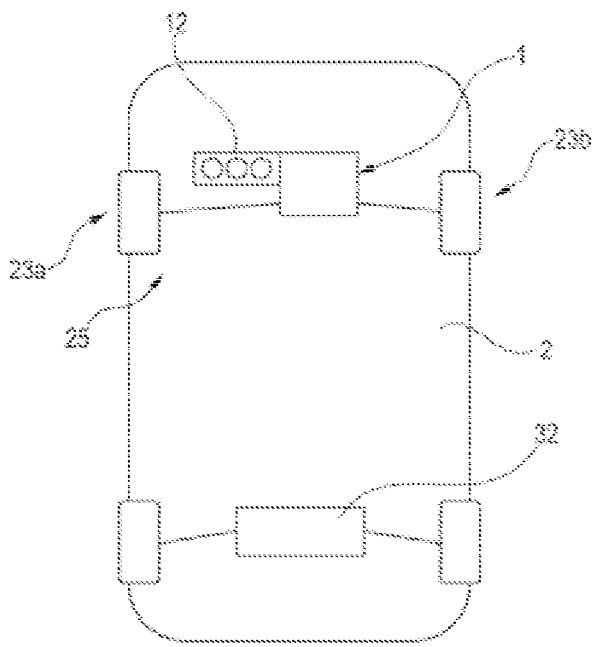
FIG. 9 shows a schematic representation of a motor vehicle with a transmission unit according to the present disclosure according to a second exemplary embodiment, wherein an electric axle drive is now also present on a rear axle of the motor vehicle.

The transmission unit 1 thus forms an input 13 which is or can be coupled to an internal combustion engine 12, and an output 14 which is drivingly coupled or couplable to an output, here two output gears 23a, 23b of the motor vehicle 2. This is a front-transverse arrangement of the internal combustion engine 12 together with the transmission unit 1. A rotational axis 24, shown schematically in FIG. 1, of an output shaft 22 (crankshaft) of the internal combustion engine 12 and of the transmission unit 1 is consequently oriented transversely to be approximately perpendicular to the longitudinal axis of the vehicle. FIG. 8 and FIG. 9, with regard to the second exemplary embodiment, show transverse configurations (the input and output shafts are on the same axis), wherein the present disclosure of course can also be installed in a longitudinal configuration (motor transmission in front, transmission shaft to the rear drive wheels).

According to the design as a hybrid transmission, the transmission unit 1 has a two-stage planetary gearing 3 and an electric machine 7 that is operatively connected to this planetary gearing 3. The basic structure of the transmission unit 1 can be seen particularly well in FIG. 1. Accordingly, the planetary wheel set 3 has a first planetary wheel set 4, which forms the first gear stage of the planetary gearing 3, and a second planetary wheel set 5, which forms the second gear stage of the planetary gearing 3. The first planetary wheel set 4/the individual (first) planetary wheels 26 of the first planetary wheel set 4 mesh with a first sun gear 15 on the one hand and a first ring gear 18 on the other. The first planetary wheel set 4 is rotatably arranged with its individual (first) planetary wheels 26 on a first planetary carrier 16.

It can be seen that the first planetary carrier 16 simultaneously forms a (second) ring gear 20 of the second gear stage of the planetary gearing 3. The first planetary carrier 16 is thus non-rotatably connected to the second ring gear 20, which second ring gear 20 in turn meshes with the second planetary wheel set 5/the (second) planetary wheels 27 of the second planetary wheel set 5. The individual (second) planetary wheels 27 of the second planetary wheel set 5 also mesh with a second sun gear 17. Furthermore, the first ring gear 18 is non-rotatably connected to a second planetary carrier 19 which rotatably supports the second planetary wheels 27. The second planetary carrier 19 and the first ring gear 18 are each directly non-rotatably connected to the output 14 of the transmission unit 1/the planetary gearing 3.

The electric machine 7 typically has a stator 28 and a rotor 29 that is rotatably mounted relative to the stator 28. The rotor 29 is rotatably received within the stator 28. The rotor 29 is non-rotatably attached on a driving shaft 21 of the electric machine 7. The driving shaft 21 is arranged with its rotational axis parallel, i.e., at a distance, from the central rotational axis 24 of the transmission unit 1. Furthermore, the driving shaft 21 is rotationally coupled to the first planetary carrier 16/the second ring gear 20 of the planetary gearing 3 via a gear stage 30. As a result, the electric machine 7 is operatively connected to a component part 6 of the planetary gearing 3 in the form of the first planetary carrier 16/the second ring gear 20. In further embodiments, the electric machine 7 is also not necessarily arranged with its driving shaft 21 parallel to the rotational axis 24, but rather, for example, mounted to be coaxial to the gear axis/rotational axis 24 and more preferably directly on the first planetary carrier 16.

In FIG. 1, it can also be seen that, in principle, a torsional vibration damper 31 can be integrated into the drive train 25 on the part of the internal combustion engine 12. The torsional vibration damper 31 is arranged here between the output shaft 22 of the internal combustion engine 12 and the input 13 of the transmission unit 1. The torsional vibration damper 31 can in principle be viewed as a component part of the transmission unit 1 or as a separate component thereof.

According to the present disclosure, in FIG. 1, exactly, i.e., no more and no less than, four switching devices 8, 9, 10, 11 are integrated into the transmission unit 1 in order to use their deactivated and activated positions to implement the individual transmission ratios/gears, as shown in FIGS. 2 to 6.

A first switching device 8 is implemented as a clutch. The first switching device 8 is operatively installed between the input 13 and the first sun gear 15. By designing the first switching device 8 as a clutch, the input 13, and thus the output shaft 22 of the internal combustion engine 12 when the motor vehicle 2 is in operation, is non-rotatably coupled to the first sun gear 15 in an activated position of the switching device 8 and rotationally decoupled from the first sun gear 15, i.e., freely rotatable relative thereto, in a deactivated position of the switching device 8. The activated position of the first switching device 8 is thus a closed clutch position, whereas the deactivated position is an open clutch position.

A second switching device 9 is also implemented as a clutch. The second switching device 9 is operatively installed between the input 13 and the first planetary carrier 16. Accordingly, the input 13, and thus the output shaft 22 of the internal combustion engine 12 when the motor vehicle 2 is in operation, is non-rotatably connected to the first planetary carrier 16 in the activated position of the second switching device 9 and rotatably decoupled from the first planetary carrier 16 in a deactivated position of the second switching device 9, i.e., arranged freely rotatable relative thereto. Thus, the activated position of the second switching device 9 is a closed clutch position and the deactivated position of the second switching device 9 is an open clutch position.

The third switching device 10 and the fourth switching device 11 are each implemented as brakes. The third switching device 10 is the brake that interacts with the second sun gear 17. The third switching device 10 is thus able to brake/hold the second sun gear 17 in relation to a region 34 of the motor vehicle 2 that is fixed to the vehicle frame. In an activated position of the third switching device 10, the third switching device 10 acts on the second sun gear 17 in such a way that the latter is blocked in its rotation relative to the area 34 of the motor vehicle 2 fixed to the vehicle frame; in a deactivated position of the third switching device 10, the third switching device 10 is arranged in such a way that it enables/allows free rotation of the second sun gear 17 relative to the region 34.

The fourth switching device 11 acts substantially in the same way as the third switching device 10. However, this does not act on the second sun gear 17, but on the first sun gear 15.

In connection with FIGS. 3a to 6, the individual operating/drive states of the drive train 25 are illustrated. A (first) drive state is illustrated with FIGS. 3a to 3d. In this drive state, either only the internal combustion engine 12 or the internal combustion engine 12, supported by the electric machine 7, has a driving effect on the output gears 23a, 23b. Only the torque flow/the power flow starting from the internal combustion engine 12 is shown in FIGS. 3a to 3d. In the individual FIGS. 3a to 3d, the different four gears/ transmission ratios, as they can be implemented by means of the four switching devices 8, 9, 10, 11 are illustrated for this first drive state.

Figure 3A:
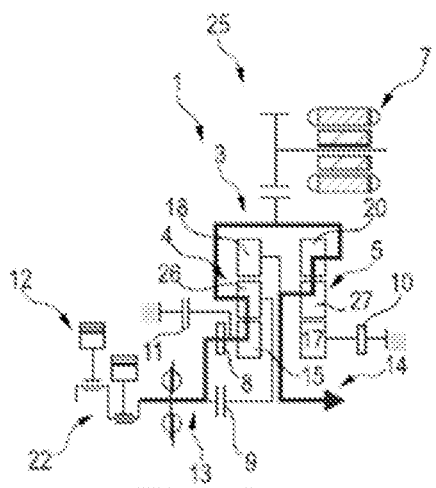

In FIG. 3*a*, the first switching device 8 and the third switching device 10 are in their activated position, while the second switching device 9 and the fourth switching device 11 are in their deactivated positions. Accordingly, a first transmission ratio is implemented via the input 13, the first sun gear 15, the first planetary wheel set 4, the first planetary carrier 16, the second ring gear 20, the second planetary wheel set 5, the second planetary carrier 19 towards the output 14.

Figure 3B:
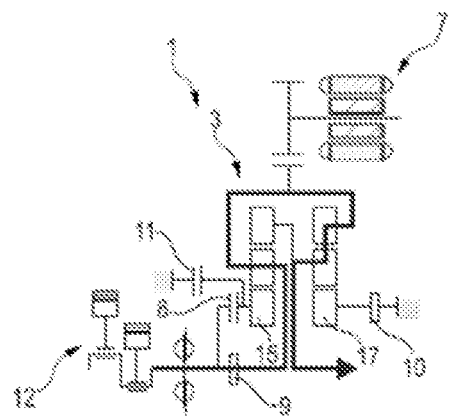

In FIG. 3*b*, the second switching device 9 and the third switching device 10 are in their activated position to implement a second transmission ratio, while the first switching device 8 and the fourth switching device 11 are switched in their deactivated position. In this case, the drive power is transmitted from the input 13 via the first planetary carrier 16, the second ring gear 20, the second planetary wheel set 5 to the output 14.

Figure 3C:
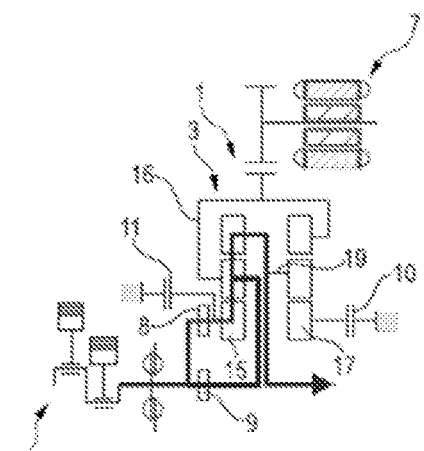

In FIG. 3*c*, a third transmission ratio is implemented, wherein the first switching device 8 and the second switching device 9 are in their activated position and the third switching device 10 and the fourth switching device 11 are in their deactivated position. The drive power is transmitted from input 13 both to first sun gear 15 and to first planetary carrier 16. From there, the drive power is transmitted via the first planetary wheel set 4 and the first ring gear 18 to the output 14.

Figure 3D:
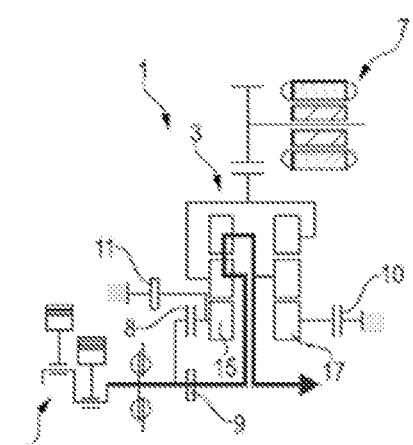

To implement a fourth transmission ratio according to FIG. 3*d*, the first switching device 8 and the third switching device 10 are in their deactivated position and the second switching device 9 and the fourth switching device 11 are in their activated position. Thus, drive power is transmitted from the input 13 via the first planetary carrier 16, the first planetary wheel set 4 and the first ring gear 18 to the output 14.

Figure 4A:
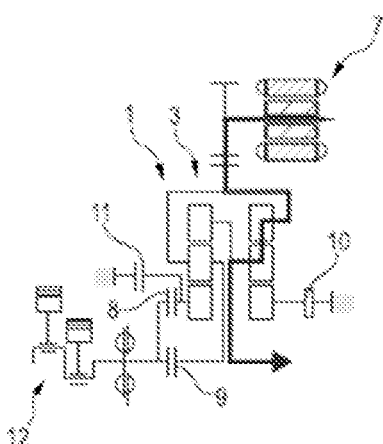
FIGS. 4a and 4b show two schematic sectional views of the transmission unit, similar to FIG. 1, wherein torque flows are visible at two different transmission ratios/gears in a drive state of an electric machine.
Figure 4B:
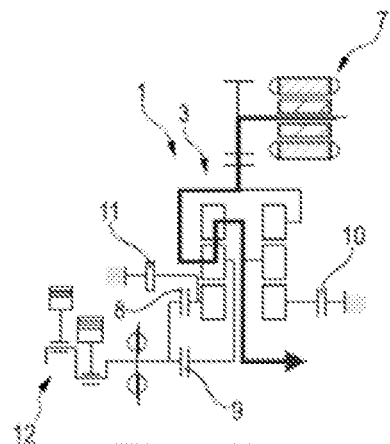

FIGS. 4*a* and 4*b* illustrate two transmission ratios for a (second) drive state of the drive train 25 of. This second drive state is a drive state of the electric machine 7 (in the case of a purely electric drive of the motor vehicle 2). In a first transmission ratio according to FIG. 4*a*, the first, second and fourth switching devices 8, 9, 11 are in their deactivated position and the third switching device 10 is in its activated position. Accordingly, a drive power of the electric machine 7 is transmitted from the driving shaft 21 via the second ring gear 20, the second planetary wheel set 5 and the second planetary carrier 19 to the output 14.

According to a second transmission ratio of the drive state of the electric machine 7 according to FIG. 4*b*, the first, second and third switching devices 8, 9, 10 are switched in their deactivated position and the fourth switching device 11 is switched in its activated position. The drive power of the electric machine 7 is transmitted from the driving shaft 21 via the first planetary carrier 16, the first planetary wheels 26 and the second ring gear 20 to the output 14.

Figure 5:
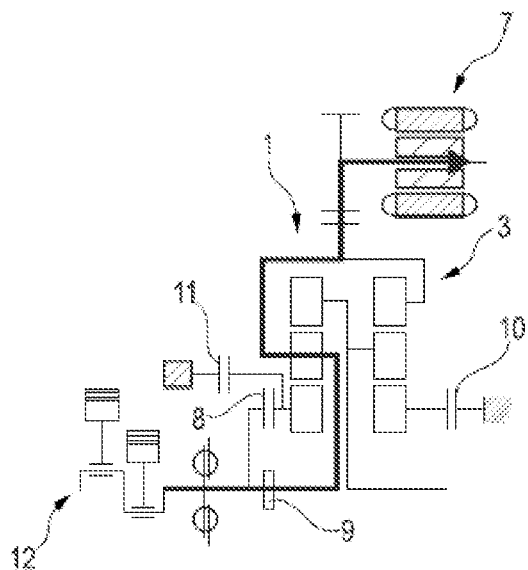
FIG. 5 shows a schematic sectional view of the transmission unit, similar to FIG. 1, wherein a torque flow is visible in a stationary state of charge.

In FIG. 5, a stationary state of charge (third operating state) of the drive train 25 is illustrated. Here, with the internal combustion engine 12 running, drive power from the internal combustion engine 12 is supplied to the electric machine 7 operating as a generator and converted there into electrical energy for storage in a battery. In this stationary state of charge, the second switching device 9 is in its activated position, whereas the first, third and fourth switching device 8, 10, 11 are switched to their deactivated positions. The drive power of the internal combustion engine 12 is transmitted via a transmission ratio formed by the first planetary carrier 16 and the gear stage 30.

Figure 6:
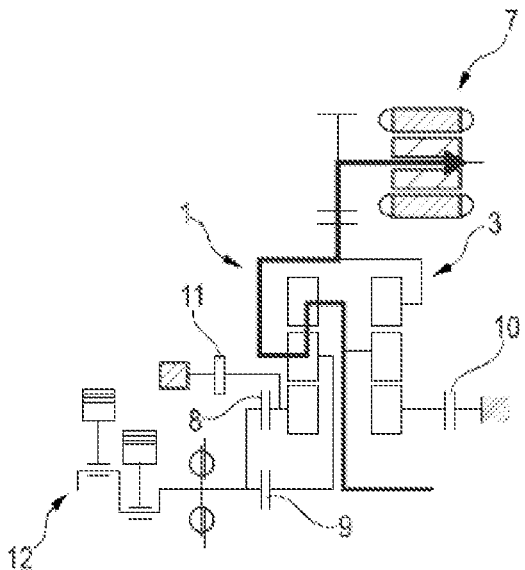
FIG. 6 shows a schematic sectional view of the transmission unit, similar to FIG. 1, wherein a torque flow is visible in a transmission ratio/a gear in a recuperation state.

In FIG. 6, a recuperation state of the electric machine 7 (fourth operating state of the drive train 25) is also illustrated, in which the electric machine 7 in turn serves as a generator and a corresponding kinetic energy of the motor vehicle 2 is supplied via the output 14, the first ring gear 18, the first planetary wheel set 4, the first planetary carrier 16 and the gear stage 30 (via a further transmission ratio) of the electric machine 7. The fourth switching device 11 is in its activated position, whereas the first switching device 8, the second switching device 9 and the third switching device 10 are each arranged in their deactivated position.

As can also be seen from the diagram in FIG. 2, two reverse gears/reverse driving states can also be implemented (for the fifth operating state of the drive train 25) via these four switching devices 8, 9, 10, 11 (K1 is first switching device 8, K2 is second switching device 9, B1 is fourth switching device 11 and B2 is third switching device 10). This is possible either purely electrically or by means of an electric continuously variable transmission (eCVT). In the purely electric reversing, the third switching device 10 is switched in its activated position, while the first, second and fourth switching devices 8, 9, 11 are arranged in their deactivated position. In the eCVT state, the first switching device 8 is activated and the remaining second to fourth switching devices 9, 10, 11 are deactivated.

Figure 7:
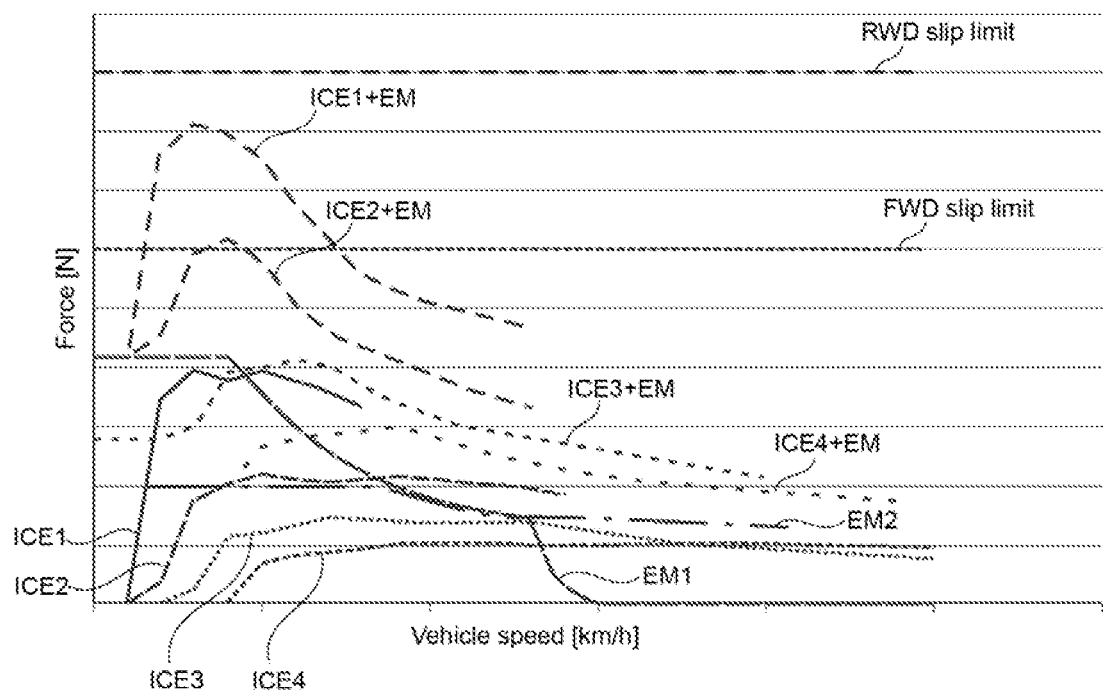
FIG. 7 shows a tractive force diagram to illustrate different characteristic curves of the drive train according to FIG. 1 assigned to the respective drive states and transmission ratios.

In conjunction with FIG. 7, different vehicle speed-power characteristics are illustrated in a tractive force diagram for the individual transmission ratios/gears. The characteristics marked ICE1, ICE2, ICE3 and ICE4 illustrate the first drive state (pure combustion engine drive) of the internal combustion engine 12 in the first gear (FIG. 3*a*), the second gear (FIG. 3*b*), the third gear (FIG. 3*c*) and fourth gear (FIG. 3*d*). The characteristics marked with ICE1+EM, ICE2+EM, ICE3+EM and ICE4+EM illustrate a further drive state (internal combustion engine drive supported by electric machine 7) with the same gears as are implemented in FIGS. 3*a* to 3*d*. The characteristics identified by EM1 and EM2 illustrate the course in two further gears when a drive power is transmitted from the electric machine 7 to the output 14 according to FIGS. 4*a* and 4*b* (purely electric drive).

A second exemplary embodiment is illustrated in connection with FIGS. 9 to 15, a third exemplary embodiment with FIGS. 16 and 17 and a fourth exemplary embodiment with FIGS. 18 and 19. In this context, it should be pointed out that these further exemplary embodiments correspond in principle to the first exemplary embodiment in terms of structure and mode of operation, so that, for the sake of brevity, only the differences from this first exemplary embodiment are described below.

In connection with FIG. 9, which illustrates the motor vehicle 2 with the transmission unit 1 of the second exemplary embodiment, it can be seen that the motor vehicle 2 can in principle also have an electric axle drive 32 so that all-wheel drive is possible.

Figures 10, 11:
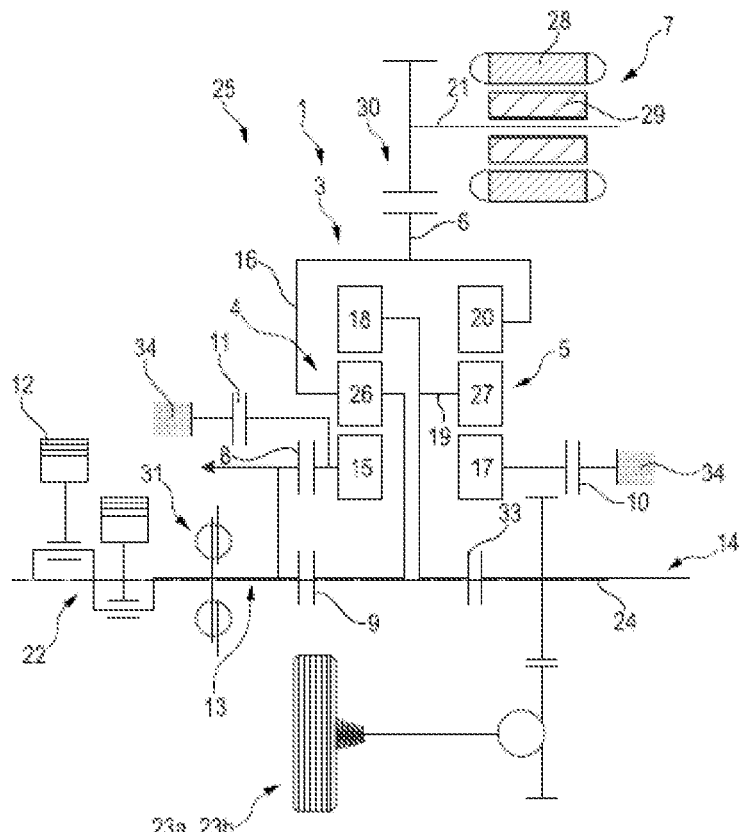
FIG. 10 shows a schematic sectional representation of the transmission unit according to the present disclosure, installed in a partially represented drive train of the motor vehicle, according to the second exemplary embodiment.
FIG. 11 shows a diagram to illustrate all the gears that can be switched by the transmission unit of FIG. 10, FIGS. 12a to 12d show four schematic sectional views of the transmission unit, similar to FIG. 10, wherein torque flows are visible with four different transmission ratios/gears in a drive state of an internal combustion engine.
Figure 12A:
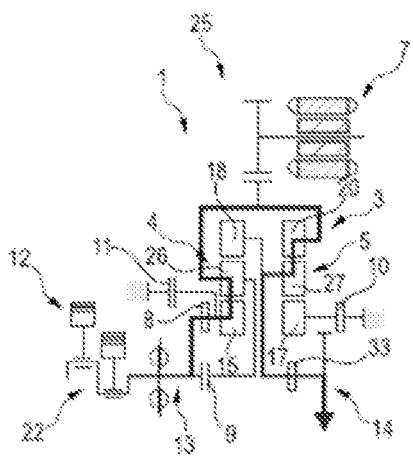
Figure 12B:
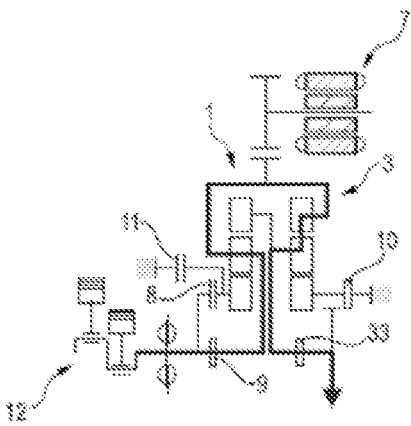
Figure 12C:
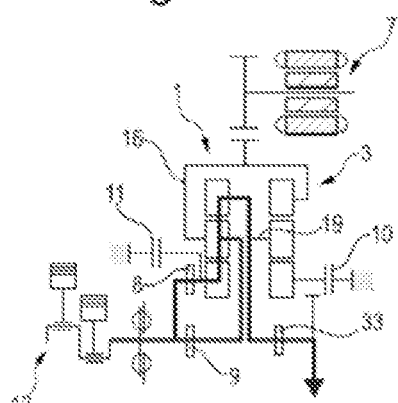
Figure 12D:
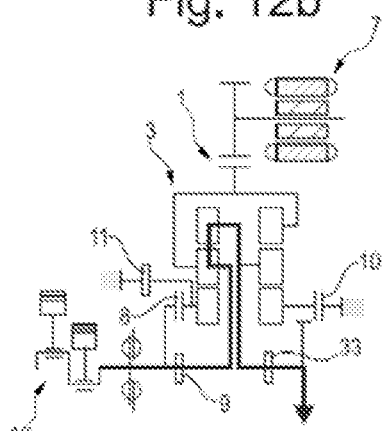
Figure 13A:
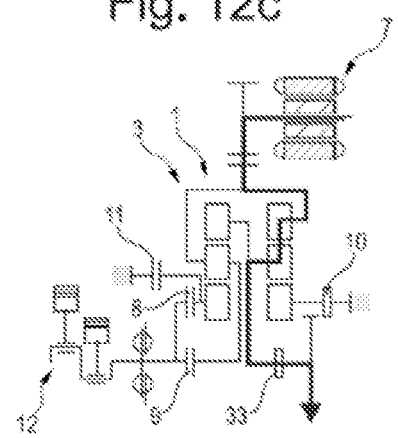
FIGS. 13a and 13b show two schematic sectional views of the transmission unit, similar to FIG. 10, wherein torque flows are visible with two different transmission ratios/gears in a drive state of an electric machine.
Figure 13B:
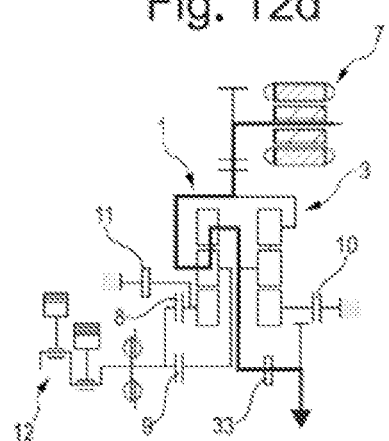
Figures 14, 15:
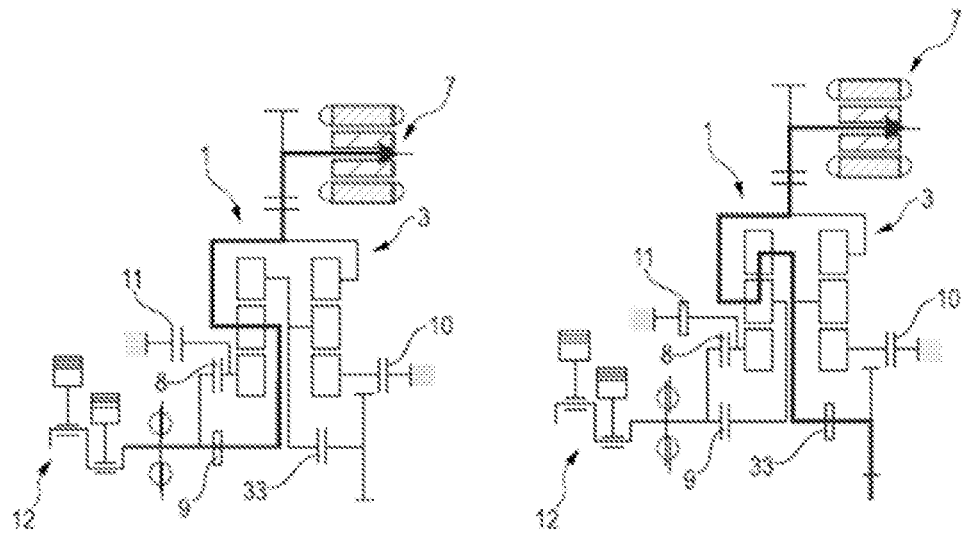
FIG. 14 shows a schematic sectional view of the transmission unit, similar to FIG. 1, wherein a torque flow is visible in a stationary state of charge/a serial operation.
FIG. 15 shows a schematic sectional view of the transmission unit, similar to FIG. 1, wherein a torque flow is visible in a transmission ratio/a gear in a recuperation state.

With FIG. 10, the more detailed structure of the transmission unit 1 is illustrated in turn. In comparison with the transmission unit 1 of the first exemplary embodiment, an additional switching device 33 is now also present, which enables the output 14 of the transmission unit 1 to be decoupled from the further output/output gears 23*a*, 23*b*. The additional switching device 33 is integrated in the output 14 of the transmission unit 1. As can be seen here, the transmission unit 1 can be decoupled from the output gears 23*a*, 23*b*. According to the diagram from FIG. 11 and also according to FIG. 14, this enables serial operation of the stationary charging. The individual transmission ratios can be implemented by the switching devices 8 to 11 and by the additional switching device 33 (K3), as shown in FIG. 11, and the operating states can be seen clearly in FIGS. 12a to 15, wherein these ratios, however, again correspond to those of the first exemplary embodiment (FIGS. 3a to 6).

Figure 16:
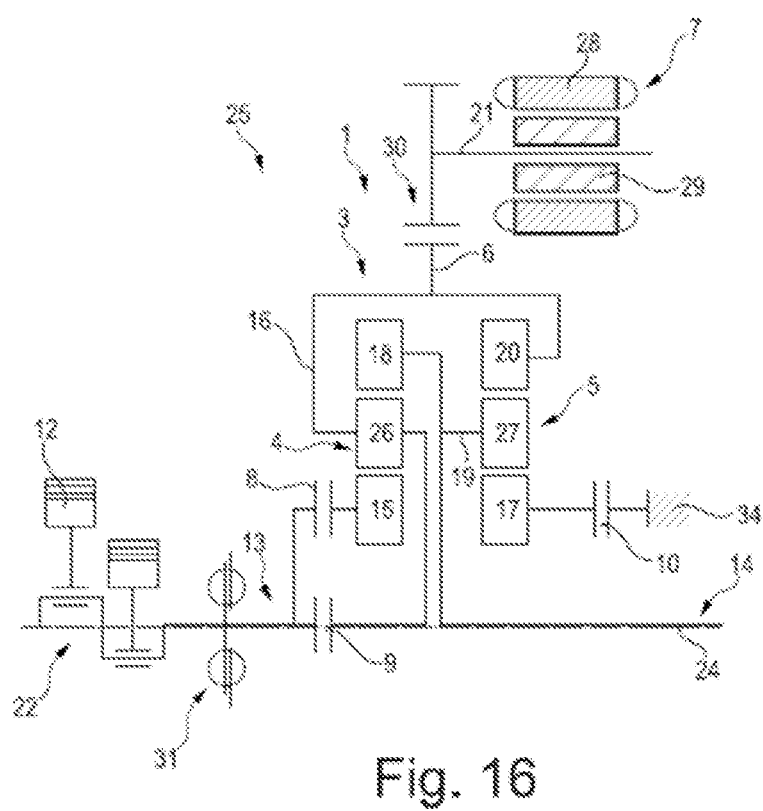
FIG. 16 shows a schematic longitudinal sectional representation of the transmission unit according to the present disclosure, installed in a partially represented drive train of the motor vehicle, according to a third exemplary embodiment.

According to the third exemplary embodiment, it is in principle also possible to dispense with the fourth switching device 11 and accordingly to provide only three switching devices 8, 9, 10 (FIG. 16). The switching devices 8, 9, 10 can be used to implement three different transmission ratios in a drive state of the internal combustion engine 12, exclusively one transmission ratio in the drive state of the electric machine 7, one transmission ratio in the stationary state of charge and two transmission ratios for reversing according to FIG. 17.

Figures 17, 18:
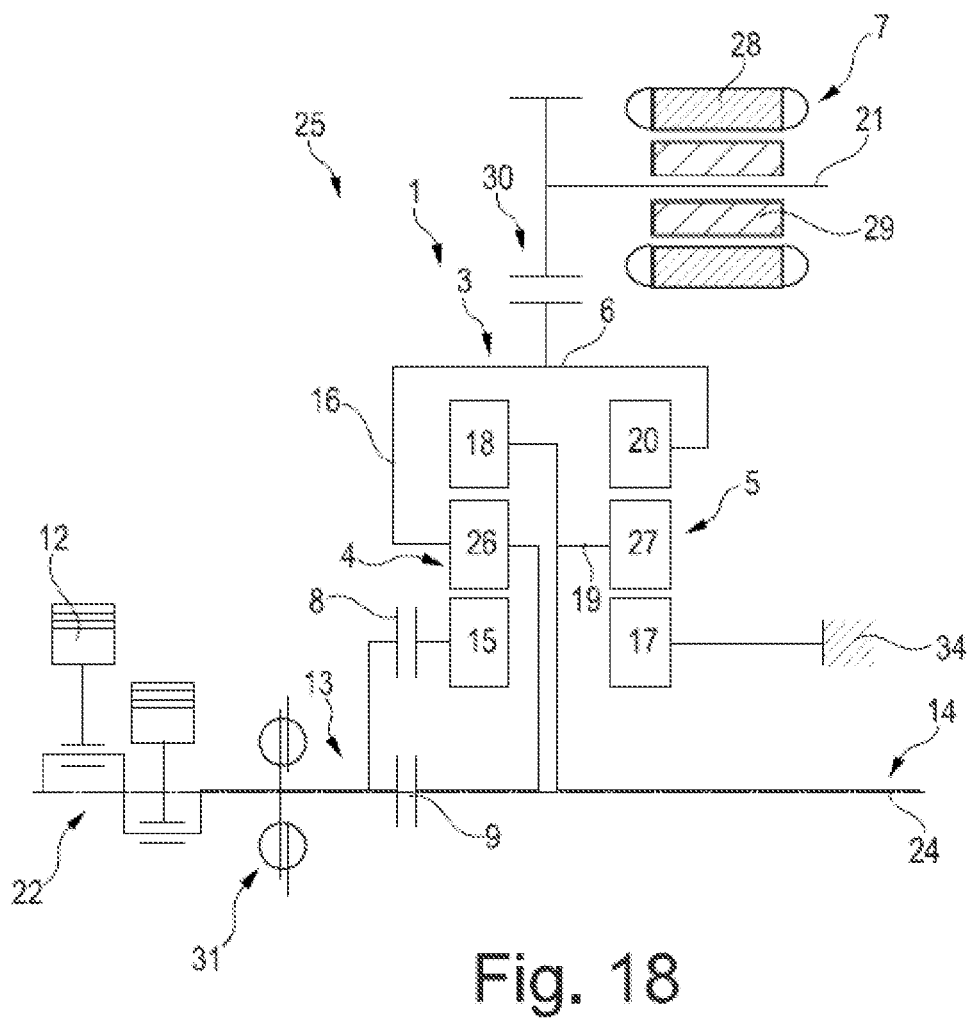
FIG. 17 shows a diagram to illustrate all the gears that can be switched by the transmission unit of FIG. 16.
FIG. 18 shows a schematic longitudinal sectional representation of the transmission unit according to the present disclosure, installed in a partially represented drive train of the motor vehicle, according to a fourth exemplary embodiment.

As can also be seen in FIGS. 18 and 19, it is in principle possible to dispense with further switching devices. In this embodiment, the two third and fourth switching devices 10 and 11 are dispensed with and only the first and second switching devices 8, 9 are provided. The second sun gear 17 is permanently connected to the area 34 in a fixed manner. As a result, at least two transmission ratios can be implemented in one drive state of the internal combustion engine 12, one transmission ratio in the drive state of the electric machine 7, one transmission ratio in the stationary state of charge and one transmission ratio for reverse driving.

In other words, a DHT concept (dedicated hybrid transmission (transmission unit 1)) is proposed according to the present disclosure having the following elements: two planetary wheel sets 4, 5; four switching elements 8, 9, 10, 11 (two brakes and two clutches); and an electric machine 7. The following functions are fulfilled with the elements of the DHT 1: four ICE gears (forward gears/gears for internal combustion engine 12); two EM gears (gears for electric machine 7); reverse gear: eCVT or electric; charging while stationary; boost and recuperation possible in all gears; serial operation with an additional drive axle: first drive axle with internal combustion engine 12, which drives electric machine 7, wherein electric machine 7 charges the battery and/or sends power to the electric axle (final drive 32), and second drive axle 32, which drives the vehicle 2. No ICE disconnect clutch is required as K1 8 and K2 9 fulfill this function. The electric machine 7 can be arranged to be coaxially or axially parallel (with a chain or spur gear).

LIST OF REFERENCE SYMBOLS

1 Transmission unit
2 Motor vehicle
3 Planetary gearing
4 First planetary wheel set
5 Second planetary wheel set
6 Component part
7 Electric machine
8 First switching device
9 Second switching device
10 Third switching device
11 Fourth switching device
12 Internal combustion engine
13 Input
14 Output
15 First sun gear
16 First planetary carrier
17 Second sun gear
18 First ring gear
19 Second planetary carrier
20 Second ring gear
21 Driving shaft
22 Output shaft
23a First driven gear
23b Second driven gear
24 Rotational axis
25 Drive train
26 First planetary wheel
27 Second planetary wheel
28 Stator
29 Rotor
30 Gear stage
31 Torsional vibration damper
32 Final drive
33 Additional switching device
34 Area

The invention claimed is:

1. A transmission unit for a hybrid motor vehicle, the transmission unit comprising:
   a planetary gearing, the planetary gearing being fitted with a first planetary wheel set and a second planetary wheel set;
   a first sun gear and a first ring gear meshing with the first planetary wheel set;
   a second sun gear and a second ring gear meshing with the second planetary wheel set;
   an electric machine coupled with a component part of the planetary gearing; and
   four or less switching devices, each forming a brake or a clutch, and each being movable between an activated position and a deactivated position, the four or less switching devices being operatively installed for switching various transmission ratios between at least one of an input, which can be coupled with an internal combustion engine, and an output, and between the electric machine and the output, the four or less switching devices configured for implementing a transmission ratio in a drive state of the electric machine, and a transmission ratio in a recuperation state of the electric machine, as a result of the activated and deactivated positions,
   a torque path flowing in the drive state from the input successively through the first sun gear, the first planetary wheel set, the second ring gear and the second planetary wheel set to the output.

2. The transmission unit according to claim 1, wherein the four or less switching devices include a first switching device and a second switching device, at least one of the first switching device and the second switching device being a clutch.

3. The transmission unit according to claim 2, wherein the first switching device is a clutch operatively installed between the input and the first sun gear such that, in the activated position of the first switching device, the input is rotationally connected to the first sun gear and, in the deactivated position of the first switching device, the input is decoupled from the first sun gear.

4. The transmission unit according to claim 2, wherein the second switching device is a clutch operatively installed between the input and a first planetary carrier of the first planetary wheel set such that, in the activated position of the second switching device, the input is rotationally connected to the first planetary carrier and, in the deactivated position of the second switching device, the input is decoupled from the first planetary carrier.

5. The transmission unit according to claim 2, wherein the four or less switching devices include a third switching device and a fourth switching device, at least one of the third switching device and the fourth switching device being a brake.

6. The transmission unit according to claim 5, wherein the third switching device is a brake acting on the second sun gear such that, in the activated position of the third switching device, a rotation of the second sun gear is blocked and, in the deactivated position of the third switching device, a free rotation of the second sun gear is enabled.

7. The transmission unit according to claim 5, wherein the fourth switching device is a brake acting on the first sun gear such that, in the activated position of the fourth switching device, a rotation of the first sun gear is blocked and, in the deactivated position of the fourth switching device, a free rotation of the first sun gear is enabled.

8. The transmission unit according to claim 1, wherein the first ring gear is non-rotatably coupled to a second planetary carrier of the second planetary wheel set and the first planetary carrier of the first planetary wheel set is non-rotatably coupled to the second ring gear.

9. The transmission unit according to claim 1, wherein a rotor-fixed driving shaft of the electric machine is rotatably coupled to a first planetary carrier of the first planetary wheel set.

10. A transmission unit for a hybrid motor vehicle, the transmission unit comprising:
a planetary gearing, the planetary gearing including a first planetary wheel set and a second planetary wheel set;
an electric machine coupled with a component part of the planetary gearing; and
switching devices including a first switching device and a second switching device, each of the first and second switching devices forming a brake or a clutch and each being movable between an activated position and a deactivated position, the switching devices being operatively installed for switching various transmission ratios between at least one of an input, which can be coupled with an internal combustion engine, and an output, and between the electric machine and the output, the switching devices being arranged and configured to:
achieve a first transmission ratio in a drive state with the first switching device in the activated position and the second switching device in the deactivated position,
achieve a second transmission ratio in the drive state with the first switching device in the deactivated position and the second switching device in the activated position,
achieve a stationary state of charge in which drive power from the internal combustion engine is supplied to the electric machine operating as a generator with the first switching device in the deactivated position and the second switching device in the activated position, and
achieve a reverse driving state with the first switching device in the activated position and the second switching device in the deactivated position.

11. The transmission unit as recited in claim 10 wherein the switching devices include a third switching device, the switching devices being arranged and configured such that:
the third switching device is in an activated position to achieve the first transmission ratio in the drive state, and
the third switching device is in the activated position to achieve the second transmission ratio in the drive state.

12. The transmission unit as recited in claim 11 wherein the switching devices are arranged and configured to:
achieve a first transmission ratio in a second drive state with the first switching device in the deactivated position, the second switching device in the deactivated position and the third switching device in the activated position, the second drive state being a drive state of the electric machine.

13. The transmission unit as recited in claim 12 wherein the switching devices include a fourth switching device, the switching devices being arranged and configured to:
achieve a second transmission ratio in the second drive state with the first switching device in the deactivated position, the second switching device in the deactivated position, the third switching device in the deactivated position and the fourth switching device in the activated position.

14. The transmission unit as recited in claim 11 wherein the switching devices are arranged and configured to:
achieve a third transmission ratio in the drive state with the first switching device in the activated position, the second switching device in the activated position and the third switching device in a deactivated position.

15. The transmission unit as recited in claim 14 wherein the switching devices include a fourth switching device, the switching devices being arranged and configured to:
achieve a fourth transmission ratio in the drive state with the first switching device in the deactivated position, the second switching device in the activated position, the third switching device in a deactivated position and the second switching device in the activated position.

16. The transmission unit as recited in claim 15 wherein the switching devices are arranged and configured such that:
the fourth switching device is in a deactivated position to achieve the first transmission ratio in the drive state,
the fourth switching device is in the deactivated position to achieve the second transmission ratio in the drive state, and
the fourth switching device is in the deactivated position to achieve the third transmission ratio in the drive state.

17. The transmission unit as recited in claim 15 wherein the first and second switching devices are clutches and the third and fourth switching devices are brakes.

18. The transmission unit as recited in claim 15 further comprising a first sun gear meshing with the first planetary wheel set and a first planetary carrier carrying the first planetary wheel set,
the first switching device being arranged and configured such that the input is non-rotatably coupled to the first sun gear in the activated position of the first switching device and rotationally decoupled from the first sun gear in the deactivated position of the first switching device,
the second switching device being arranged and configured such that the input is non-rotatably coupled to the first planetary carrier in the activated position of the second switching device and rotationally decoupled from the first planetary carrier in the deactivated position of the second switching device.

19. The transmission unit as recited in claim 17 further comprising a second sun gear meshing with the second planetary wheel set,
the third switching device being arranged and configured such that the third switching device in the activated position acts on the second sun gear in such a way that the second sun gear is blocked from rotating relative to a region of the motor vehicle fixed to a vehicle frame and the third switching device in the deactivated position enables free rotation of the second sun gear relative to the region of the motor vehicle fixed to the vehicle frame.

20. A transmission unit for a hybrid motor vehicle, the transmission unit comprising:
   a planetary gearing, the planetary gearing being fitted with a first planetary wheel set and a second planetary wheel set;
   an electric machine coupled with a component part of the planetary gearing; and
   four or less switching devices, each forming a brake or a clutch, and each being movable between an activated position and a deactivated position, the four or less switching devices being operatively installed for switching various transmission ratios between at least one of an input, which can be coupled with an internal combustion engine, and an output, and between the electric machine and the output, the four or less switching devices configured for implementing a transmission ratio in a drive state of the electric machine, and a transmission ratio in a recuperation state of the electric machine, as a result of the activated and deactivated positions,
   wherein the four or less switching devices include a first switching device and a second switching device, at least one of the first switching device and the second switching device being a clutch,
   wherein the four or less switching devices include a third switching device and a fourth switching device, at least one of the third switching device and the fourth switching device being a brake,
   wherein:
      the third switching device is a brake acting on a second sun gear, the second sun gear meshing with the second planetary wheel set of the planetary gearing such that, in the activated position of the third switching device, a rotation of the second sun gear is blocked and, in the deactivated position of the third switching device, a free rotation of the second sun gear is enabled, or
      the fourth switching device is a brake acting on a first sun gear, the first sun gear meshing with the first planetary wheel set of the planetary gearing such that, in the activated position of the fourth switching device, a rotation of the first sun gear is blocked and, in the deactivated position of the fourth switching device, a free rotation of the first sun gear is enabled.

* * * * *